UNITED STATES PATENT OFFICE.

ROBERT W. DAVIS, JR., OF WYANDOTTE, MICHIGAN, ASSIGNOR TO PENNSYLVANIA SALT MANUFACTURING COMPANY, OF WYANDOTTE, MICHIGAN, A CORPORATION OF PENNSYLVANIA.

METHOD OF MANUFACTURING ELECTRODES.

1,039,034. Specification of Letters Patent. Patented Sept. 17, 1912.

No Drawing. Application filed May 25, 1912. Serial No. 699,801.

*To all whom it may concern:*

Be it known that I, ROBERT W. DAVIS, Jr., a resident of Wyandotte, Wayne county, Michigan, have invented a new and useful Method of Manufacturing Electrodes, of which the following is a full, clear, and exact description.

My invention relates to the manufacture of electrodes by converting portions of a shaped iron or steel article into magnetic oxid of iron ($Fe_3O_4$). Different methods have been proposed for the manufacture of such electrodes, but have not proven entirely satisfactory in practice.

My invention is based upon the discovery that when iron or steel of the desired shape is treated in a furnace which is heated with hydrogen gas under an air supply which is slightly deficient for perfect combustion, an efficient layer of practically pure magnetic oxid of a good conductivity can be formed on the article. If the hydrogen is in great excess over that required for complete combustion, a reducing action is afforded. If the air is in excess over that required for combustion with the hydrogen, an oxidizing action is present, but will produce the sesquioxid, which would be useless for electrolytic work. I have found, however, that by burning hydrogen with air under conditions where the hydrogen is slightly in excess of that required for complete combustion, the magnetic oxid will be formed of a proper character for electrode use. Apparently, this result is obtained by the formation of aqueous vapor in an atmosphere containing hydrogen under conditions which serve the double purpose of producing the reaction and the heat necessary for such reaction between the hot water vapor and the hot iron or steel. The change is believed to occur in successive stages, layer after layer of the magnetic oxid being formed until the coating is of the desired properties and thickness.

I preferably employ a temperature of between 600 degrees centigrade and 1100 degrees centigrade, in order to obtain a layer having the desired characteristics. The higher the temperature the more rapid is the oxidation.

The operation is conducted in such a manner that the products of combustion leaving the oxidizing chamber contain unburned hydrogen.

The essential feature appears to be the absence of excess air, this being preferably insured by sufficient excess hydrogen to prevent the formation of ferric oxid.

I claim:—

1. In the manufacture of electrodes and other articles, the step consisting of heating iron or steel in a furnace fired with hydrogen gas in the absence of air in excess of that required for complete combustion.

2. The method of making electrodes and other articles, consisting in heating iron or steel in a furnace, by firing said furnace with hydrogen gas in the presence of a slightly deficient amount of air to complete combustion.

3. In the manufacture of electrodes and other articles, the step consisting of heating iron or steel in a furnace at a temperature above 600 degrees centigrade fired with hydrogen gas in the absence of air in excess of that required for complete combustion.

4. The method of making electrodes and other articles, consisting in heating iron or steel at a temperature above 600 degrees centigrade in a furnace, by firing said furnace with hydrogen gas in the presence of a slightly deficient amount of air to complete combustion.

5. In the manufacture of electrodes and other articles, the steps consisting of heating iron or steel articles in a furnace by means of a hydrogen flame, and burning said hydrogen flame in the presence of a slight excess of hydrogen for a sufficient time to produce a substantial layer of magnetic oxid of iron.

In testimony whereof, I have hereunto set my hand.

R. W. DAVIS, JR.

Witnesses:
 H. A. SUHLKE,
 CARL B. GOTTS.